United States Patent
Lin et al.

(10) Patent No.: US 12,443,521 B2
(45) Date of Patent: Oct. 14, 2025

(54) DECODING PARAMETER UPDATING METHOD, MEMORY STORAGE DEVICE AND MEMORY CONTROL CIRCUIT UNIT

(71) Applicant: PHISON ELECTRONICS CORP., Miaoli (TW)

(72) Inventors: Yu-Hsiang Lin, Yunlin County (TW); Bo Lun Huang, Tainan (TW)

(73) Assignee: PHISON ELECTRONICS CORP., Miaoli (TW)

( * ) Notice: Subject to any disclaimer, the term of this patent is extended or adjusted under 35 U.S.C. 154(b) by 140 days.

(21) Appl. No.: 18/443,304

(22) Filed: Feb. 16, 2024

(65) Prior Publication Data

US 2025/0238362 A1    Jul. 24, 2025

(30) Foreign Application Priority Data

Jan. 19, 2024   (TW) ................. 113102304

(51) Int. Cl.
  *G06F 12/02*   (2006.01)
  *G06F 3/06*    (2006.01)
(52) U.S. Cl.
  CPC ........ *G06F 12/0246* (2013.01); *G06F 3/0619* (2013.01); *G06F 2212/7201* (2013.01)
(58) Field of Classification Search
  CPC ... G11C 29/04; G11C 29/42; G11C 29/56008; G06F 11/1068; G06F 11/1072; G06F 11/14; G06F 3/0619; G06F 12/0246
  See application file for complete search history.

(56) References Cited

U.S. PATENT DOCUMENTS

| | | | |
|---|---|---|---|
| 2015/0169401 A1* | 6/2015 | Tseng | G06F 11/1068 714/773 |
| 2020/0201569 A1* | 6/2020 | Hsiao | G11C 29/36 |

FOREIGN PATENT DOCUMENTS

TW     201742067     12/2017

OTHER PUBLICATIONS

"Office Action of Taiwan Counterpart Application", issued on Jul. 26, 2024, pp. 1-6.

* cited by examiner

*Primary Examiner* — Shelly A Chase
(74) *Attorney, Agent, or Firm* — JCIPRNET

(57) ABSTRACT

A decoding parameter updating method, a memory storage device, and a memory control circuit unit are disclosed. The method includes the following. A reading command sequence is sent to a rewritable non-volatile memory module to instruct reading of first data from a first physical unit based on multiple read voltage levels. A logical operation is performed on a first data group to obtain decoding index information corresponding to the first data group. The first data group includes the first data and second data read from a second physical unit. Error evaluation information corresponding to a first voltage interval among multiple voltage intervals is obtained according to the first data and the decoding index information. A first decoding parameter corresponding to the first voltage interval is updated according to the error evaluation information.

27 Claims, 10 Drawing Sheets

| Voltage interval | 811 | 812 | 813 | 814 | 815 | 816 |
|---|---|---|---|---|---|---|
| HB | 1 | 1 | 1 | 0 | 0 | 0 |
| SB(1) | 1 | 1 | 0 | 0 | 1 | 1 |
| SB(2) | 1 | 0 | 0 | 0 | 0 | 1 |
| Number of memory cells | N(1) | N(2) | N(3) | N(4) | N(5) | N(6) |
| Number of first bits | M1(1) | M1(2) | M1(3) | M1(4) | M1(5) | M1(6) |
| Number of second bits | M2(1) | M2(2) | M2(3) | M2(4) | M2(5) | M2(6) |
| First error evaluation information | E1(1) | E1(2) | E1(3) | E1(4) | E1(5) | E1(6) |
| Second error evaluation information | E2(1) | E2(2) | E2(3) | E2(4) | E2(5) | E2(6) |
| LLR | LLR(1) | LLR(2) | LLR(3) | LLR(4) | LLR(5) | LLR(6) |
| LLR' | LLR(1)' | LLR(2)' | LLR(3)' | LLR(4)' | LLR(5)' | LLR(6)' |

FIG. 10

| Sub-evaluation information | Corresponding state |
|---|---|
| P1(XOR=1) | Only the first data includes the erroneous bit |
| P2(XOR=1) | Only the second data includes the erroneous bit |
| P3(XOR=0) | Both the first data and the second data do not include the erroneous bits |
| P4(XOR=0) | Both the first data and the second data include the erroneous bits |

FIG. 11

DECODING PARAMETER UPDATING METHOD, MEMORY STORAGE DEVICE AND MEMORY CONTROL CIRCUIT UNIT

CROSS-REFERENCE TO RELATED APPLICATION

This application claims the priority benefit of Taiwan application serial no. 113102304, filed on Jan. 19, 2024. The entirety of the above-mentioned patent application is hereby incorporated by reference herein and made a part of this specification.

BACKGROUND

Technical Field

The disclosure relates to a decoding parameter updating method, a memory storage device, and a memory control circuit unit.

Description of Related Art

Portable electronic devices such as mobile phones and notebook computers have grown rapidly in recent years, resulting in a rapid increase in consumer demand for storage media. since a rewritable non-volatile memory module (e.g., a flash memory) has characteristics of non-volatile data, power saving, small size, and no mechanical structure, it is very suitable to be built in the various portable electronic devices exemplified above.

As a data storage density of the rewritable non-volatile memory module becomes higher and higher, interference between memory cells in the rewritable non-volatile memory module becomes more and more serious, resulting in data read from the rewritable non-volatile memory module to be more prone to errors. Generally speaking, when a bit error rate (BER) of the data being read is high, a memory controller may try to improve a success rate of decoding the data through a soft decoding mode. However, if a decoding parameter used by a decoding circuit in the memory controller is inappropriate, it will be difficult for the decoding circuit to successfully decode the data regardless of whether it enters the soft decoding mode. In addition, for a memory controller that support a cross-physical unit (or multi-frame) encoding/decoding mechanism, if too much data belonging to the same encoding group may not be successfully decoded, cross-physical unit (or multi-frame) decoding may not be performed successfully.

SUMMARY

The disclosure provides a decoding parameter updating method, a memory storage device, and a memory control circuit unit, which may improve a decoding success rate of data.

An exemplary embodiment of the disclosure provides a decoding parameter updating method for a rewritable non-volatile memory module. The rewritable non-volatile memory module includes multiple physical units, and the decoding parameter updating method includes the following. At least one reading command sequence is sent to the rewritable non-volatile memory module to instruct reading of first data from a first physical unit among the physical units based on multiple read voltage levels. A logical operation is performed on a first data group to obtain decoding index information corresponding to the first data group. The first data group includes the first data and second data read from at least one second physical unit among the physical units, and the decoding index information reflects a result of performing the logical operation on the first data and the second data. Error evaluation information corresponding to a first voltage interval among multiple voltage intervals is obtained according to the first data and the decoding index information. The voltage intervals are defined by the read voltage levels, and the voltage intervals respectively correspond to multiple decoding parameters. A first decoding parameter corresponding to the first voltage interval among the decoding parameters is updated according to the error evaluation information.

An exemplary embodiment of the disclosure further provides a memory storage device, including a connection interface unit, a rewritable non-volatile memory module, and a memory control circuit unit. The connection interface unit is configured to be coupled to a host system. The rewritable non-volatile memory module includes multiple physical units. The memory control circuit unit is coupled to the connection interface unit and the rewritable non-volatile memory module. The memory control circuit unit is configured to send at least one reading command sequence to the rewritable non-volatile memory module to instruct reading of first data from a first physical unit among the physical units based on multiple read voltage levels; perform a logical operation on a first data group to obtain decoding index information corresponding to the first data group, in which the first data group includes the first data and second data read from at least one second physical unit among the physical units, and the decoding index information reflects a result of performing the logical operation on the first data and the second data; obtain error evaluation information corresponding to a first voltage interval among multiple voltage intervals according to the first data and the decoding index information, in which the voltage intervals are defined by the read voltage levels, and the voltage intervals respectively correspond to multiple decoding parameters; and update a first decoding parameter corresponding to the first voltage interval among the decoding parameters according to the error evaluation information.

An exemplary embodiment of the disclosure further provides a memory control circuit unit configured to control a rewritable non-volatile memory module. The rewritable non-volatile memory module includes multiple physical units. The memory control circuit unit includes a host interface, a memory interface, a decoding circuit, and a memory management circuit. The host interface is configured to be coupled to a host system. The memory interface is configured to be coupled to the rewritable non-volatile memory module. The memory management circuit is coupled to the host interface, the memory interface, and the decoding circuit. The memory management circuit is configured to send at least one reading command sequence to the rewritable non-volatile memory module to instruct reading of first data from a first physical unit among the physical units based on multiple read voltage levels; perform a logical operation on a first data group to obtain decoding index information corresponding to the first data group, in which the first data group includes the first data and second data read from at least one second physical unit among the physical units, and the decoding index information reflects a result of performing the logical operation on the first data and the second data; obtain error evaluation information corresponding to a first voltage interval among multiple voltage intervals according to the first data and the decoding index information, in which the voltage intervals are defined by the read voltage levels, and the voltage intervals respectively correspond to multiple decoding parameters; and update a first decoding parameter corresponding to the first voltage interval among the decoding parameters according to the error evaluation information.

Based on the above, after reading the first data from the first physical unit based on the read voltage levels, one logical operation may be performed on the first data group to obtain the decoding index information corresponding to the first data group. The first data group includes the first data and the second data read from the second physical unit. Thereafter, according to the first data and the decoding index information, the error evaluation information corresponding to the first voltage interval among the voltage intervals can be obtained and used to update the first decoding parameter corresponding to the first voltage interval. In this way, the subsequent decoding success rate of the data read from one single physical unit may be improved, thereby improving the success rate of the multi-frame decoding of the entire data group.

BRIEF DESCRIPTION OF THE DRAWINGS

FIG. 10 is a schematic view of a data table according to an exemplary embodiment of the disclosure.

FIG. 11 is a schematic view of recording error state descriptions respectively corresponding to multiple sub-evaluation information according to an exemplary embodiment of the present disclosure.

DETAILED DESCRIPTION OF DISCLOSED EMBODIMENTS

Generally speaking, a memory storage device (also known as a memory storage system) includes a rewritable non-volatile memory module and a controller (also known as a control circuit). A memory storage device may be used with a host system, so that the host system may write data to or read the data from the memory storage device.

Figure 1:
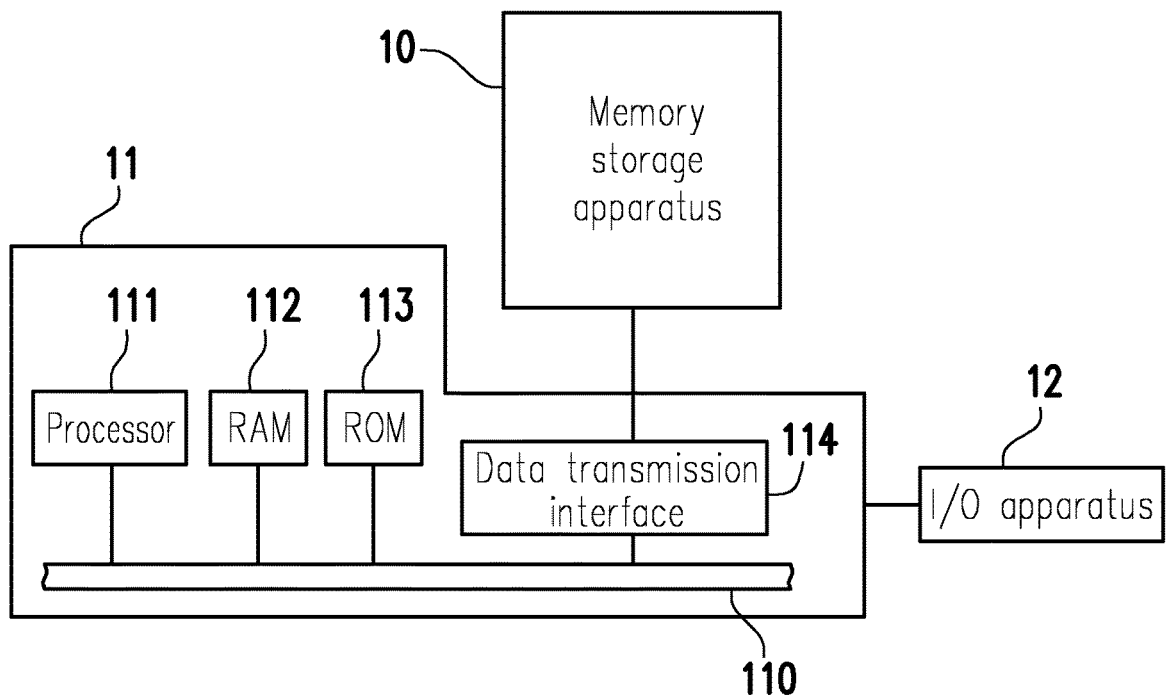
FIG. 1 is a schematic view of a host system, a memory storage device, and an input/output (I/O) device according to an exemplary embodiment of the disclosure.
Figure 2:
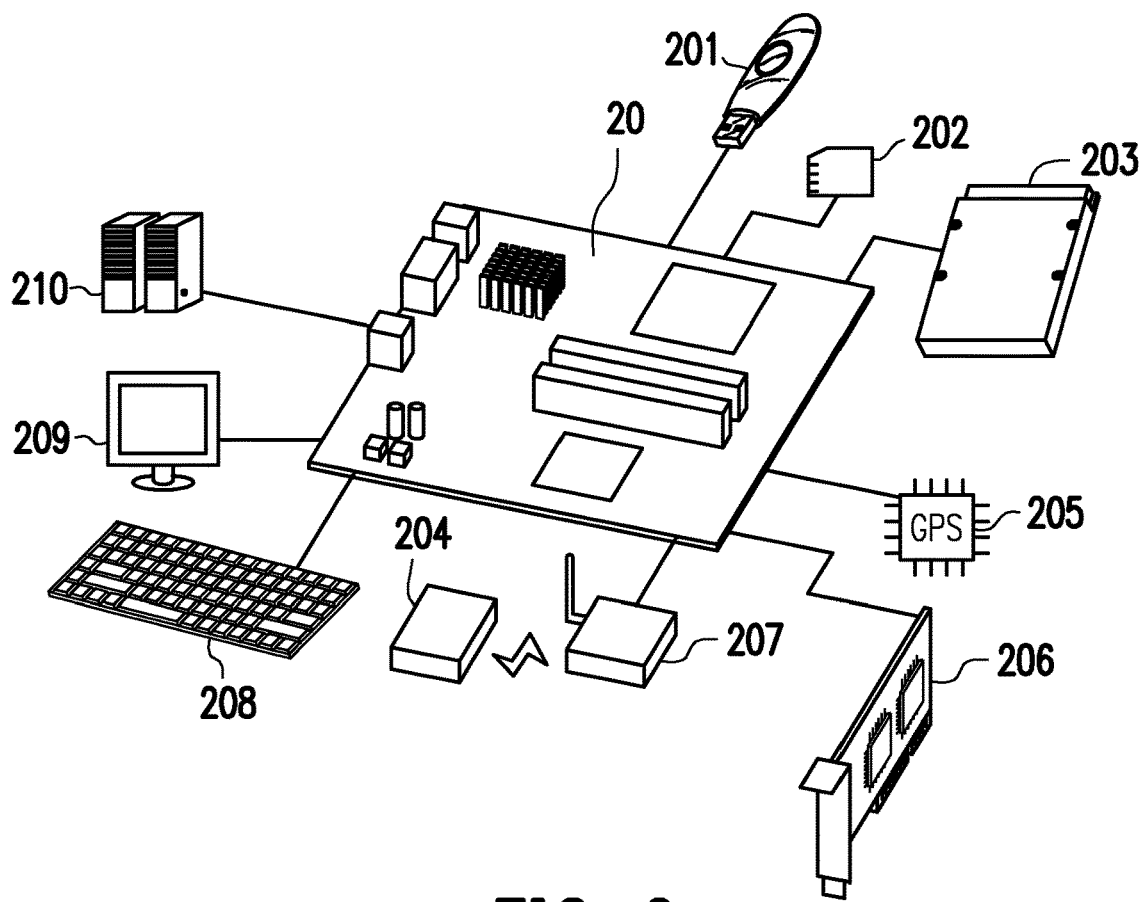
FIG. 2 is a schematic view of a host system, a memory storage device, and an I/O device according to an exemplary embodiment of the disclosure.

FIG. 1 is a schematic view of a host system, a memory storage device, and an input/output (I/O) device according to an exemplary embodiment of the disclosure. FIG. 2 is a schematic view of a host system, a memory storage device, and an I/O device according to an exemplary embodiment of the disclosure.

Referring to FIGS. 1 and 2, a host system 11 may include a processor 111, a random access memory (RAM) 112, a read only memory (ROM) 113, and a data transmission interface 114. The processor 111, the random access memory 112, the read only memory 113, and the data transmission interface 114 may be coupled to a system bus 110.

In an exemplary embodiment, the host system 11 may be coupled to a memory storage device 10 through the data transmission interface 114. For example, the host system 11 may store data to or read the data from the memory storage device 10 through the data transmission interface 114. In addition, the host system 11 may be coupled to an I/O device 12 through the system bus 110. For example, the host system 11 may transmit an output signal to the I/O device 12 or receive an input signal from the I/O device 12 through the system bus 110.

In an exemplary embodiment, the processor 111, the random access memory 112, the read only memory 113, and the data transmission interface 114 may be disposed on a motherboard 20 of the host system 11. The number of data transmission interfaces 114 may be one or more. Through the data transmission interface 114, the motherboard 20 may be coupled to the memory storage device 10 in a wired or wireless manner.

In an exemplary embodiment, the memory storage device 10 may be, for example, a flash drive 201, a memory card 202, a solid state drive (SSD) 203, or a wireless memory storage device 204. The wireless memory storage device 204 may be, for example, a memory storage device based on various wireless communication technologies, such as a near field communication (NFC) memory storage device, a WiFi memory storage device, a Bluetooth memory storage device, or a low-power Bluetooth memory storage device (e.g., iBeacon). In addition, the motherboard 20 may also be coupled to various I/O devices, such as a global positioning system (GPS) module 205, a network interface card 206, a wireless transmission device 207, a keyboard 208, a screen 209, a speaker 210, through the system bus 110. For example, in an exemplary embodiment, the motherboard 20 may access the wireless memory storage device 204 through the wireless transmission device 207.

In an exemplary embodiment, the host system 11 is a computer system. In an exemplary embodiment, the host system 11 may be any system that may substantially cooperate with the memory storage device to store the data. In an exemplary embodiment, the memory storage device 10 and the host system 11 may respectively include a memory storage device 30 and a host system 31 in FIG. 3.

Figure 3:
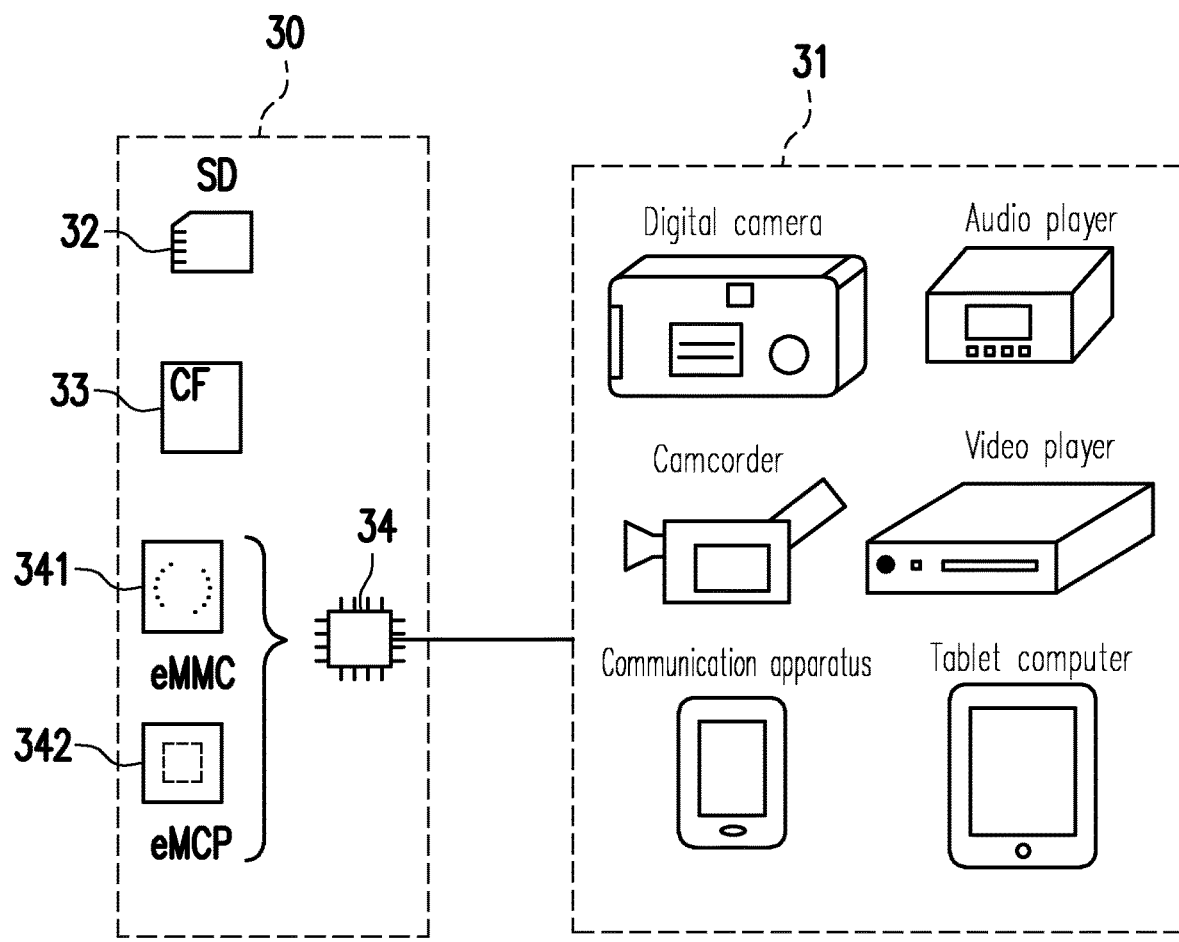
FIG. 3 is a schematic view of a host system and a memory storage device according to an exemplary embodiment of the disclosure.

FIG. 3 is a schematic view of a host system and a memory storage device according to an exemplary embodiment of the disclosure. Referring to FIG. 3, the memory storage device 30 may be used along with the host system 31 to store the data. For example, the host system 31 may be a system, such as a digital camera, a video camera, a communication device, an audio player, a video player, or a tablet computer. For example, the memory storage device 30 may be various non-volatile memory storage devices, such as a secure digital (SD) card 32, a compact flash (CF) card 33, or an embedded storage device 34 used by the host system 31. The embedded storage device 34 includes various types of embedded storage devices that directly couple a memory module to a substrate of the host system, such as an embedded multi media card (eMMC) 341 and/or an embedded multi chip package (eMCP) storage device 342.

Figure 4:
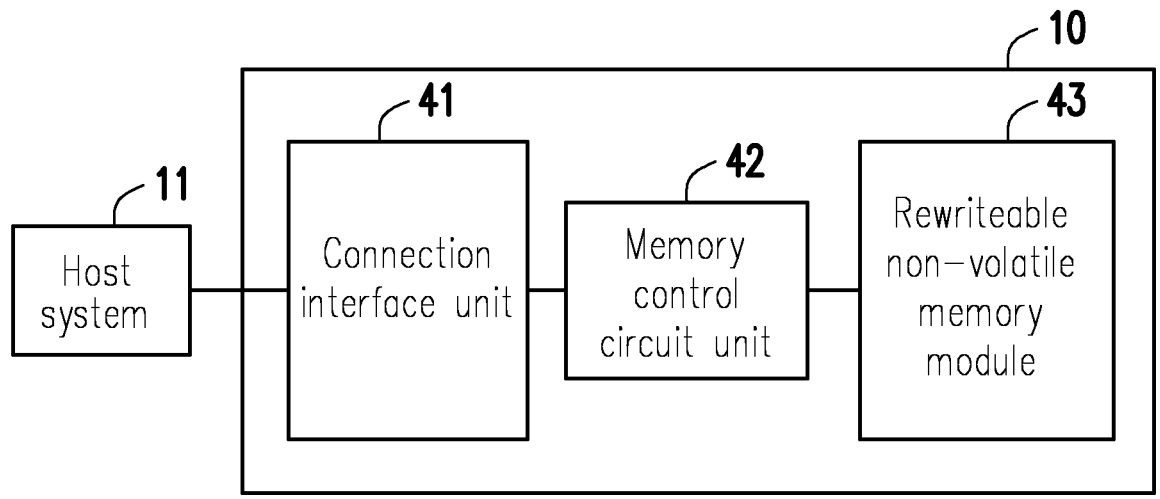
FIG. 4 is a schematic view of a memory storage device according to an exemplary embodiment of the disclosure.

FIG. 4 is a schematic view of a memory storage device according to an exemplary embodiment of the disclosure. Referring to FIG. 4, the memory storage device 10 includes a connection interface unit 41, a memory control circuit unit 42, and a rewritable non-volatile memory module 43.

The connection interface unit 41 is configured to be coupled to the host system 11. The memory storage device 10 may communicate with the host system 11 through the connection interface unit 41. In an exemplary embodiment, the connection interface unit 41 is compatible with a peripheral component interconnect express (PCI Express) standard. In an exemplary embodiment, the connection interface unit 41 may also be compliant with a serial advanced technology attachment (SATA) standard, a parallel advanced technology attachment (PATA) standard, an institute of electrical and electronics engineers (IEEE) 1394 standard, a universal serial bus (USB) standard, a SD interface standard, an ultra high speed-I (UHS-I) interface standard, an ultra high speed-II (UHS-II) interface standard, a memory stick (MS) interface standard, a MCP interface standard, a MMC interface standard, an eMMC interface standard, a universal flash storage (UFS) interface standard, an eMCP interface standard, a CF interface standard, an integrated device electronics (IDE) standard, or other suitable standards. The connection interface unit 41 may be packaged in a chip with the memory control circuit unit 42, or the connection interface unit 41 may be arranged outside a chip including the memory control circuit unit 42.

The memory control circuit unit 42 is coupled to the connection interface unit 41 and the rewritable non-volatile memory module 43. The memory control circuit unit 42 is configured to perform multiple logic gates or control commands implemented in a form of hardware or firmware and perform operations such as writing, reading, and erasing on the data in the rewritable non-volatile memory module 43 according to commands of the host system 11.

The rewritable non-volatile memory module 43 is configured to store the data written by the host system 11. The rewritable non-volatile memory module 43 may include a single level cell (SLC) NAND flash memory module (i.e., a flash memory module that may store 1 bit in one memory cell), a multi level cell (MLC) NAND flash memory module (i.e., a flash memory module that may store 2 bits in one memory cell), a triple level cell (TLC) NAND flash memory module (i.e., a flash memory module that may store 3 bits in one memory cell), a quad level cell (QLC) NAND flash memory module (i.e., a flash memory module that may store 4 bits in one memory cell), other flash memory modules, or other memory modules with the same characteristics.

Each of the memory cells in the rewritable non-volatile memory module 43 stores one or more bits based on changes in a voltage (hereinafter also referred to as a critical voltage). Specifically, there is a charge trapping layer between a control gate and a channel of each of the memory cells. By applying a write voltage to the control gate, an amount of electrons in the charge trapping layer may be changed, thereby changing the critical voltage of the memory cell. Such operation of changing the critical voltage of the memory cell is also called "writing the data into the memory cell" or "programming the memory cell". As the critical voltage changes, each of the memory cells in the rewritable non-volatile memory module 43 has multiple storage states. By applying a read voltage, it may be determined which storage state one memory cell belongs to, thereby obtaining one or more bits stored in the memory cell.

In an exemplary embodiment, the memory cells of the rewritable non-volatile memory module 43 may form multiple physical programming units, and the physical programming units may form multiple physical erasing units. Specifically, the memory cells on the same word line may form one or more physical programming units. If each of the memory cells may store more than 2 bits, the physical programming units on the same word line may at least be classified into lower physical programming units and upper physical programming units. For example, a least significant bit (LSB) of one memory cell belongs to the lower programming unit, and a most significant bit (MSB) of one memory cell belongs to the upper programming unit. Generally speaking, in the MLC NAND flash memory, a writing speed of the lower physical programming unit will be greater than a writing speed of the upper physical programming unit, and/or reliability of the lower physical programming unit is higher than reliability of the upper physical programming unit.

In an exemplary embodiment, the physical programming unit is the smallest unit for programming. That is, the physical programming unit is the smallest unit for writing the data. For example, the physical programming unit may be a physical page or a physical sector. If the physical programming unit is the physical page, the physical programming units may include data bit areas and redundancy bit areas. The data bit area includes multiple physical sectors to store user data, while the redundant bit area is configured to store system data (e.g., management data such as error correction codes). In an exemplary embodiment, the data bit area includes 32 physical sectors, and a size of one physical sector is 512 bytes (B). However, in other exemplary embodiments, the data bit area may also include 8, 16, or more or less physical sectors, and the size of each of the physical sectors may also be larger or smaller. On the other hand, the physical erasing unit is the smallest unit of erasing. That is, each of the physical erasing units includes a minimum number of erased memory cells. For example, the physical erasing unit is a physical block.

Figure 5:
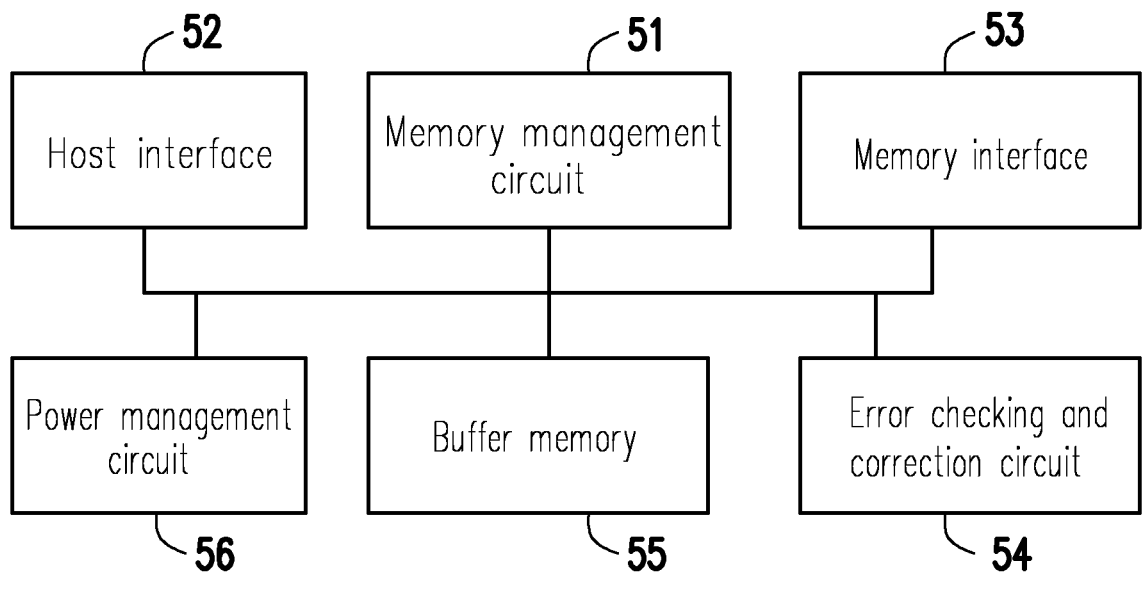
FIG. 5 is a schematic view of a memory control circuit unit according to an exemplary embodiment of the disclosure.

FIG. 5 is a schematic view of a memory control circuit unit according to an exemplary embodiment of the disclosure. Referring to FIG. 5, the memory control circuit unit 42 includes a memory management circuit 51, a host interface 52, and a memory interface 53.

The memory management circuit 51 is configured to control an overall operation of the memory control circuit unit 42. Specifically, the memory management circuit 51 has multiple control commands, and when the memory storage device 10 is operating, the control commands will be executed to perform the operations such as writing, reading, and erasing on the data. When an operation of the memory management circuit 51 is described below, it is equivalent to describing operations of the memory control circuit unit 42 and the memory storage device 10.

In an exemplary embodiment, the control commands of the memory management circuit 51 are implemented in the form of firmware. For example, the memory management circuit 51 has a microprocessor unit (not shown) and a read only memory (not shown), and the control commands are burned into the read only memory. When the memory storage device 10 is operating, the control commands will be executed by the microprocessor unit to perform the operations such as writing, reading, and erasing on the data.

In an exemplary embodiment, the control commands of the memory management circuit 51 may also be stored in a specific area of the rewritable non-volatile memory module 43 (e.g., a system area in the memory module dedicated to storing the system data) in a form of program codes. In addition, the memory management circuit 51 has the microprocessor unit (not shown), the read only memory (not shown), and a random access memory (not shown). In particular, the read only memory has a boot code, and when the memory control circuit unit 42 is enabled, the microprocessor unit will first execute the boot code to load the control commands stored in the rewritable non-volatile memory module 43 into the random access memory of the memory management circuit 51. Afterwards, the microprocessor unit will run the control commands to perform the operations such as writing, reading, and erasing on the data.

In an exemplary embodiment, the control commands of the memory management circuit 51 can also be implemented in a form of hardware. For example, the memory management circuit 51 includes a microcontroller, a memory cell management circuit, a memory writing circuit, a memory reading circuit, a memory erasing circuit, and a data processing circuit. The memory cell management circuit, the memory writing circuit, the memory reading circuit, the memory erasing circuit, and the data processing circuit are coupled to the microcontroller. The memory cell management circuit is configured to manage the memory cells or memory cell groups of the rewritable non-volatile memory module 43. The memory writing circuit is configured to issue a writing command sequence to the rewritable non-volatile memory module 43 to write the data into the rewritable non-volatile memory module 43. The memory reading circuit is configured to issue a reading command sequence to the rewritable non-volatile memory module 43 to read the data from the rewritable non-volatile memory module 43. The memory erasing circuit is configured to issue an erasing command sequence to the rewritable non-volatile memory module 43 to erase the data from the rewritable non-volatile memory module 43. The data processing circuit is configured to process the data to be written to the rewritable non-volatile memory module 43 and the data to be read from the rewritable non-volatile memory module 43. The writing command sequence, the reading command sequence, and the erasing command sequence may respectively include one or more program codes or command codes, and are configured to instruct the rewritable non-volatile memory module 43 to perform the corresponding operations, such as writing, reading, and erasing. In an exemplary embodiment, the memory management circuit 51 may also issue other types of command sequences to the rewritable non-volatile memory module 43 to instruct execution of the corresponding operations.

The host interface 52 is coupled to the memory management circuit 51. The memory management circuit 51 may communicate with the host system 11 through the host interface 52. The host interface 52 may be configured to receive and identify commands and data transmitted by the host system 11. For example, the commands and data transmitted by the host system 11 may be transmitted to the memory management circuit 51 through the host interface 52. In addition, the memory management circuit 51 may send the data to the host system 11 through the host interface 52. In this exemplary embodiment, the host interface 52 is compliant with the PCI Express standard. However, it is required to be understood that the disclosure is not limited thereto. The host interface 52 may also be compatible with the SATA standard, the PATA standard, the IEEE 1394 standard, the USB standard, the SD standard, the UHS-I standard, the UHS-II standard, the MS standard, the MMC standard, the eMMC standard, the UFS standard, the CF standard, the IDE standard, or other suitable data transmission standards.

The memory interface 53 is coupled to the memory management circuit 51, and is configured to access the rewritable non-volatile memory module 43. For example, the memory management circuit 51 may access the rewritable non-volatile memory module 43 through the memory interface 53. That is to say, the data to be written to the rewritable non-volatile memory module 43 will be converted into a format acceptable to the rewritable non-volatile memory module 43 through the memory interface 53. Specifically, if the memory management circuit 51 is about to access the rewritable non-volatile memory module 43, the memory interface 53 will send the corresponding command sequence. For example, the command sequences may include the writing command sequence instructing to write the data, the reading command sequence instructing to read the data, the erasing command sequence instructing to erase the data, and the corresponding command sequences to instruct various memory operations (e.g., changing read voltage levels or performing garbage collection (GC) operations, etc.). The command sequences are generated, for example, by the memory management circuit 51 and transmitted to the rewritable non-volatile memory module 43 through the memory interface 53. The command sequences may include one or more signals or data on a bus. The signals or data may include command codes or program codes. For example, the reading command sequence will include information such as identification codes and memory addresses for reading.

In an exemplary embodiment, the memory control circuit unit 42 further includes an error checking and correction circuit 54, a buffer memory 55, and a power management circuit 56.

The error checking and correction circuit 54 is coupled to the memory management circuit 51, and is configured to perform an error checking and correction operation to ensure accuracy of the data. Specifically, when the memory management circuit 51 receives the writing command from the host system 11, the error checking and correction circuit 54 will generate a corresponding error correcting code (ECC) and/or error detecting code (EDC) for the data corresponding to the writing command, and the memory management circuit 51 will write the data corresponding to the writing command and the corresponding error correcting code and/or error detecting code into the rewritable non-volatile memory module 43. Afterwards, when the memory management circuit 51 reads the data from the rewritable non-volatile memory module 43, it will also read the error correcting code and/or error detecting code corresponding to the data, and the error checking and correction circuit 54 will perform the error checking and correction operations on the read data according to the error correcting code and/or error detecting code. For example, the error checking and correction circuit 54 may adopt various encoding/decoding algorithms, such as a low density parity check code (LDPC code), a BCH code, a Reed-solomon code (RS code), an exclusive OR (XOR) code, to encode and decode the data.

The buffer memory 55 is coupled to the memory management circuit 51, and is configured to temporarily store the data. The power management circuit 56 is coupled to the memory management circuit 51, and is configured to control a power supply of the memory storage device 10.

In an exemplary embodiment, the rewritable non-volatile memory module 43 in FIG. 4 may include a flash memory module. In an exemplary embodiment, the memory control circuit unit 42 in FIG. 4 may include a flash memory controller. In an exemplary embodiment, the memory management circuit 51 in FIG. 5 may include a flash memory management circuit.

Figure 6:
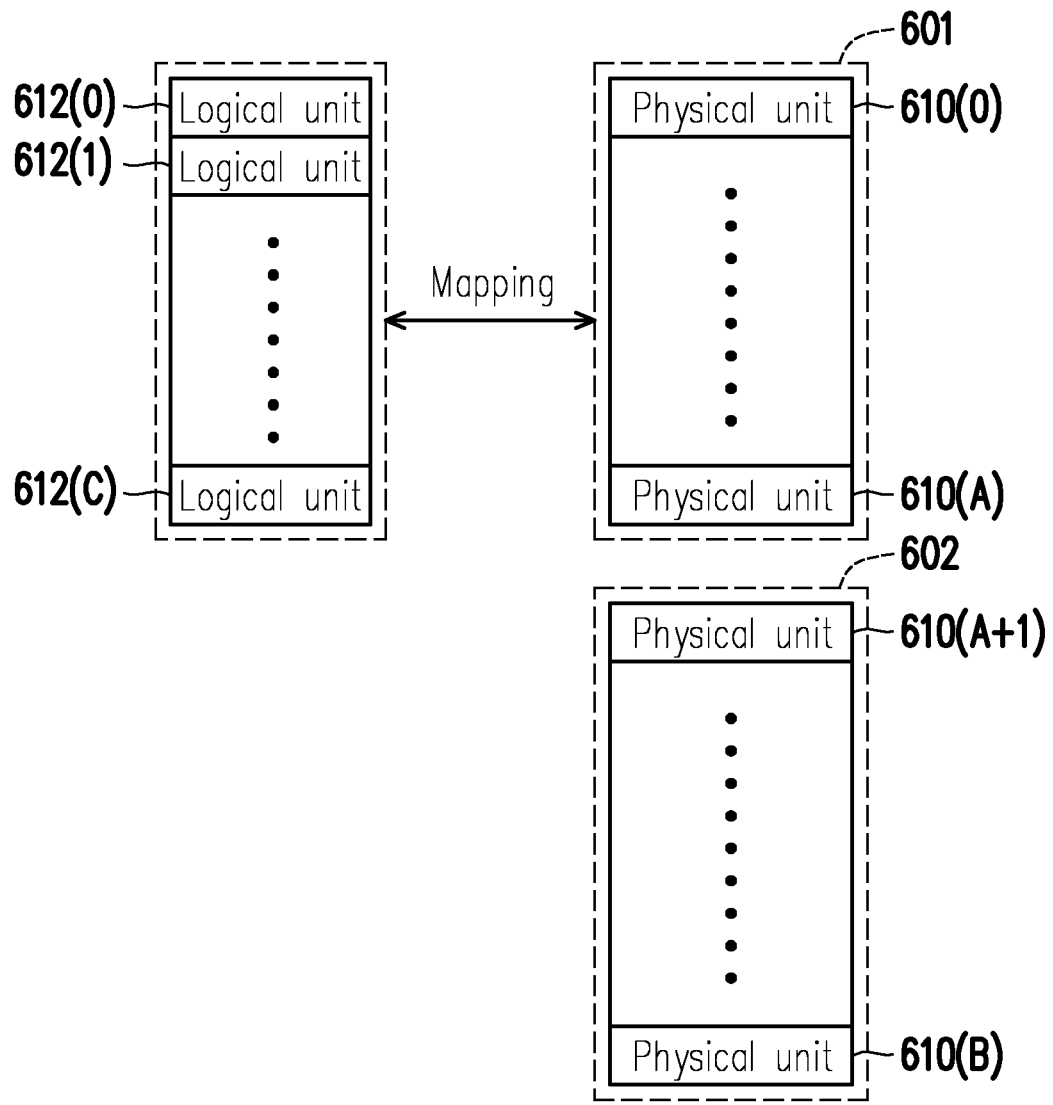
FIG. 6 is a schematic view of managing a rewritable non-volatile memory module according to an exemplary embodiment of the disclosure.

FIG. 6 is a schematic view of managing a rewritable non-volatile memory module according to an exemplary embodiment of the disclosure. Referring to FIG. 6, the memory management circuit 51 may logically group physical units 610(0) to 610(B) in the rewritable non-volatile memory module 43 into a storage area 601 and a spare area 602.

In an exemplary embodiment, one physical unit refers to one physical address or one physical programming unit. In an exemplary embodiment, one physical unit may also be formed by multiple consecutive or discontinuous physical addresses. In an exemplary embodiment, one physical unit may also refer to a virtual block (VB). One virtual block may include multiple physical addresses or multiple physical programming units. In an exemplary embodiment, one virtual block may include one or more physical erasing units.

In an exemplary embodiment, the physical units 610(0) to 610(A) in the storage area 601 are configured to store the user data (e.g., the user data from the host system 11 in FIG. 1). For example, the physical units 610(0) to 610(A) in the storage area 601 may store valid data and invalid data. The physical units 610(A+1) to 610(B) in the spare area 602 do not store the data (e.g., the valid data). For example, if one certain physical unit does not store the valid data, the physical unit may be associated (or added) to the spare area 602. In addition, the physical units in the spare area 602 (or the physical units that do not store the valid data) may be erased. As new data is written, one or more physical units may be retrieved from the spare area 602 to store the new data. In an exemplary embodiment, the spare area 602 is also called a free pool.

In an exemplary embodiment, the memory management circuit 51 may be provided with logical units 612(0) to 612(C) to map the physical units 610(0) to 610(A) in the storage area 601. In an exemplary embodiment, each of the logical units corresponds to a logical address. For example, one logical address may include one or more logical block addresses (LBA) or other logical management units. In an exemplary embodiment, one logical unit may also correspond to a logical programming unit or be formed by multiple consecutive or discontinuous logical addresses.

It should be noted that one logical unit may be mapped to one or more physical units. If one certain physical unit is currently mapped by one certain logical unit, it means that the data currently stored in the physical unit includes the valid data. On the contrary, if one certain physical unit is not currently mapped by any one of the logical units, it means that the data currently stored in the physical unit is the invalid data.

In an exemplary embodiment, the memory management circuit 51 may record management data describing a mapping relationship between the logical units and the physical units (also referred to as logical-to-physical mapping information) in at least one logical-to-physical mapping table. When the host system 11 is about to read the data from or write the data to the memory storage device 10, the memory management circuit 51 may access the rewritable non-volatile memory module 43 according to the information in the logic-to-physical mapping table.

In an exemplary embodiment, a basic unit of encoding/decoding performed by the error checking and correction circuit 54 is a frame (also called a data frame). In an exemplary embodiment, one frame includes 256 bits. However, in another exemplary embodiment, one frame may also include more (e.g., 4K bytes) or less bits.

In an exemplary embodiment, the error checking and correction circuit 54 may perform single-frame encoding and decoding on the data in a single frame. For example, the error checking and correction circuit 54 may perform the single-frame encoding and decoding based on the LDPC code. However, the disclosure is not limited thereto.

In an exemplary embodiment, the error checking and correction circuit 54 may also perform multi-frame encoding and decoding on the data in multiple frames. For example, the error checking and correction circuit 54 may perform the multi-frame encoding and decoding based on the BCH code, the RS code, and/or the XOR code. However, the disclosure is not limited thereto.

In an exemplary embodiment, according to the adopted encoding/decoding algorithm, the error checking and correction circuit 54 may encode the data to be protected to generate corresponding error correcting code and/or error detecting code. The error correcting code and/or error detecting code generated through encoding may then be used to correct errors in the data to be protected. For convenience of description, the error correcting code and/or error detecting code generated through encoding will be collectively referred to as parity data below.

In an exemplary embodiment, the memory management circuit 51 may manage the physical units 610(0) to 610(A) by using multiple physical unit groups. One physical unit group may include multiple physical units. One physical unit group may be configured to store multiple frames. One physical unit may be configured to store one or more frames. One single physical unit group may include physical units in the same (or different) memory plane, the same (or different) memory die, and/or the same (or different) chip enabled (CE) area.

In an exemplary embodiment, an encoding circuit in the error checking and correction circuit 54 may perform the single-frame encoding on one single frame stored in one certain physical unit to protect the data in the single frame by using the parity data generated by the single-frame encoding. In an exemplary embodiment, a decoding circuit in the error checking and correction circuit 54 may perform single-frame decoding on the single frame read from one certain physical unit to correct errors in the single frame by using the parity data generated by the single-frame encoding.

In an exemplary embodiment, the encoding circuit in the error checking and correction circuit 54 may perform the multi-frame encoding on multiple frames stored in one certain physical unit group to protect the data in the frames by using the parity data generated by the multi-frame encoding. In an exemplary embodiment, the decoding circuit in the error checking and correction circuit 54 may perform multi-frame decoding on multiple frames read from one certain physical unit group to correct errors in the frames by using the parity data generated by the multi-frame encoding.

Figure 7:
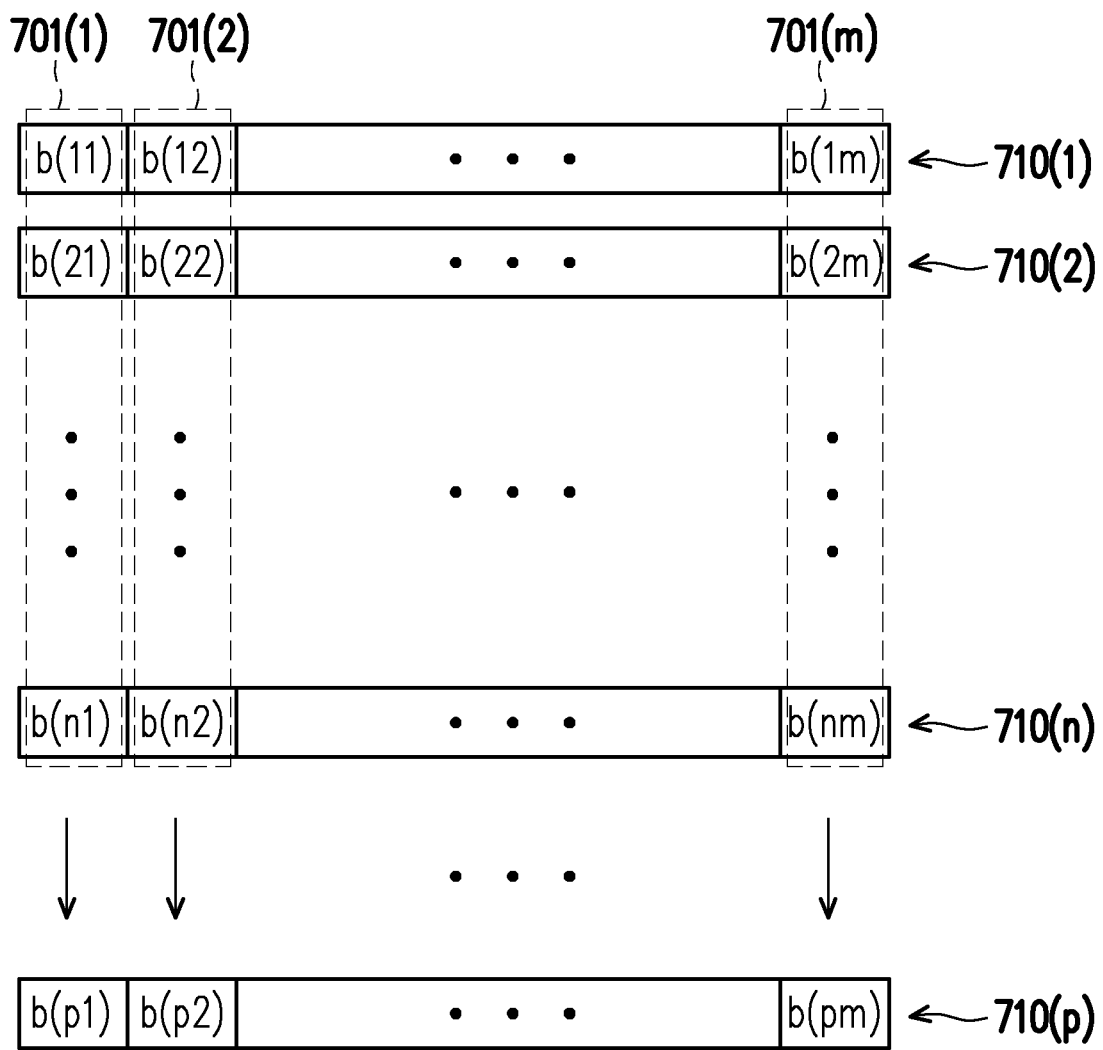
FIG. 7 is a schematic view of multi-frame encoding according to an exemplary embodiment of the disclosure.

FIG. 7 is a schematic view of multi-frame encoding according to an exemplary embodiment of the disclosure. Referring to FIG. 7, frames 710(1) to 710(n) include the data stored in one certain physical unit group (also called a first physical unit group). For example, the first physical unit group may include the physical units 610(1) to 610(n) in FIG. 6. The frame 710(k) includes the data to be stored in the physical unit 610(k), and k is between 1 and n.

In an exemplary embodiment, the error checking and correction circuit 54 may perform the multi-frame encoding on the frames 710(1) to 710(n) to generate a frame 710(p). The data in the frame 710(p) includes the parity data used to protect the frames 710(1) to 710(n). For example, when the multi-frame decoding is performed on the frames 710(1) to 710(n), the parity data in the frame 710(p) may be used to detect and/or correct errors in the frames 710(1) to 710(n).

In an exemplary embodiment, in the multi-frame encoding, the data in the frames 710(1) to 710(n) is encoded based on a position of each of bits. For example, bits b(11), b(21), . . . , b(n1) at a position 701(1) may be encoded to obtain a bit b(p1) in the frame 710(p), and bits b(12), b(22), . . . , b(n2) at a position 701(2) may be encoded to obtain a bit b(p2) in the frame 710(p). By analogy, bits b(1m), b(2m), . . . , b(nm) at a position 701(m) may be encoded to obtain a bit b(pm) in the frame 710(p). Thereafter, in the multi-frame decoding, the bits (also called parity bits) in the frame 710(p) may be used to detect and/or correct erroneous bits in the frames 710(1) to 710(n). For example, the bit b(p2) in the frame 710(p) may be used to detect or correct one or more erroneous bits in the position 701(2).

It should be noted that in an exemplary embodiment, an arrangement of the bits covered by any one of the positions 701(1) to 701(m) may be different from an arrangement shown in FIG. 7, and the disclosure is not limited thereto. In addition, in an exemplary embodiment, the number of frames 710(p) including the parity data may also be 2 or more to provide different or better multi-frame decoding capabilities, and the disclosure is not limited thereto.

In an exemplary embodiment, the error checking and correction circuit 54 may also perform the single-frame encoding on the frame 710(j) in the frames 710(1) to 710(n) and 710(p) to generate the parity data used to protect the frame 710(j), where j is between 1 and n, or j may be p. Thereafter, in the single-frame decoding, the parity data generated by performing the single-frame encoding on the frame 710(j) may be used to detect and/or correct the erroneous bits in the frame 710(j).

In an exemplary embodiment, the parity data generated by performing the multi-frame encoding in the frame 710(p) is also called a redundant array of independent disks (RAID) error correction code. In an exemplary embodiment, the frames 710(1) to 710(n) and 710(p) may also be combined into a block code. The frames 710(1) to 710(n) and 710(p) may be stored in the physical units in the first physical unit group.

In an exemplary embodiment, when it is desired to read the data stored in one certain physical unit (also referred to as a first physical unit) in the first physical unit group, the memory management circuit 51 may send the reading command sequence to the rewritable non-volatile memory module 43. The reading command sequence may instruct the rewritable non-volatile memory module 43 to read the data (also called first data) from the first physical unit. The rewritable non-volatile memory module 43 may return the data (i.e., the first data) read from the first physical unit to the memory management circuit 51 according to the reading instruction sequence.

In an exemplary embodiment, in a single-frame decoding mode, the error checking and correction circuit 54 may perform the single-frame decoding on the first data. For example, if the single-frame encoding is performed on the first data based on the LDPC code, the error checking and correction circuit 54 may perform the single-frame decoding on the first data based on the LDPC code. If the single-frame decoding for the first data is successful (indicating that the first data is correct, and/or all the erroneous bits in the first data have been corrected), the error checking and correction circuit 54 may output the successfully decoded data.

In an exemplary embodiment, if the single-frame decoding for the first data fails (indicating that the single-frame decoding performed may not correct all the erroneous bits in the first data), the error checking and correction circuit 54 may enter a multi-frame decoding mode to perform the multi-frame decoding on a data group including the first data (also called the first data group). For example, assuming that the multi-frame encoding is originally performed on multiple frames in the first data group based on the RS (or XOR) code, the error checking and correction circuit 54 may also perform the multi-frame encoding on the first data group based on the RS (or XOR) code. In an exemplary embodiment, the frame that may not be corrected by the single-frame decoding is also called a UECC frame.

In an exemplary embodiment, in the multi-frame decoding based on the RS code, only two UECC frames may exist at most at the same time in the first data group to be decoded. If the first data group includes three or more UECC frames at the same time, the multi-frame decoding based on the RS code will not fully detect or correct the errors in the first data group.

In an exemplary embodiment, in the multi-frame decoding based on the XOR code, only one UECC frame may exist at most at the same time in the first data group to be decoded. If the first data group to be decoded includes two or more UECC frames at the same time, the multi-frame decoding based on the XOR code will not fully detect or correct the errors in the first data group. Therefore, after entering the multi-frame decoding mode, by reducing a total number of the UECC frames in the first data group to be decoded, a decoding success rate of the multi-frame decoding for the first data group may be effectively improved.

In an exemplary embodiment, in the single-frame decoding mode for the first data, if a bit error rate (BER) of the first data is not high, the error checking and correction circuit 54 may decode the data based on a hard decode mode in an attempt to quickly correct a small number of errors in the first data. However, if the bit error rate of the first data is high (and the hard decode mode may not successfully decode the first data), the error checking and correction circuit 54 may instead decode the data based on a soft decode mode in an attempt to increase a decoding success rate of the data (i.e., increasing the probability of successfully correcting all the errors in the data).

In an exemplary embodiment, in the hard decode mode, the memory management circuit 51 is only required to read hard bits corresponding to each of the memory cells from the first physical unit, and the error checking and correction circuit 54 may perform a decoding operation according to the obtained hard bits. However, in the soft decode mode, the memory management circuit 51 is required to read one hard bit and multiple soft bits corresponding to one single memory cell from the first physical unit at the same time, and then the error checking and correction circuit 54 may perform the decoding operation according to the obtained hard bit and soft bits. That is to say, compared to the hard decode mode, in the soft decode mode, the memory management circuit 51 is required to read more data (i.e., the soft bits) used to assist decoding from the rewritable non-volatile memory module 43, thereby improving the decoding success rate of the data.

Figure 8:
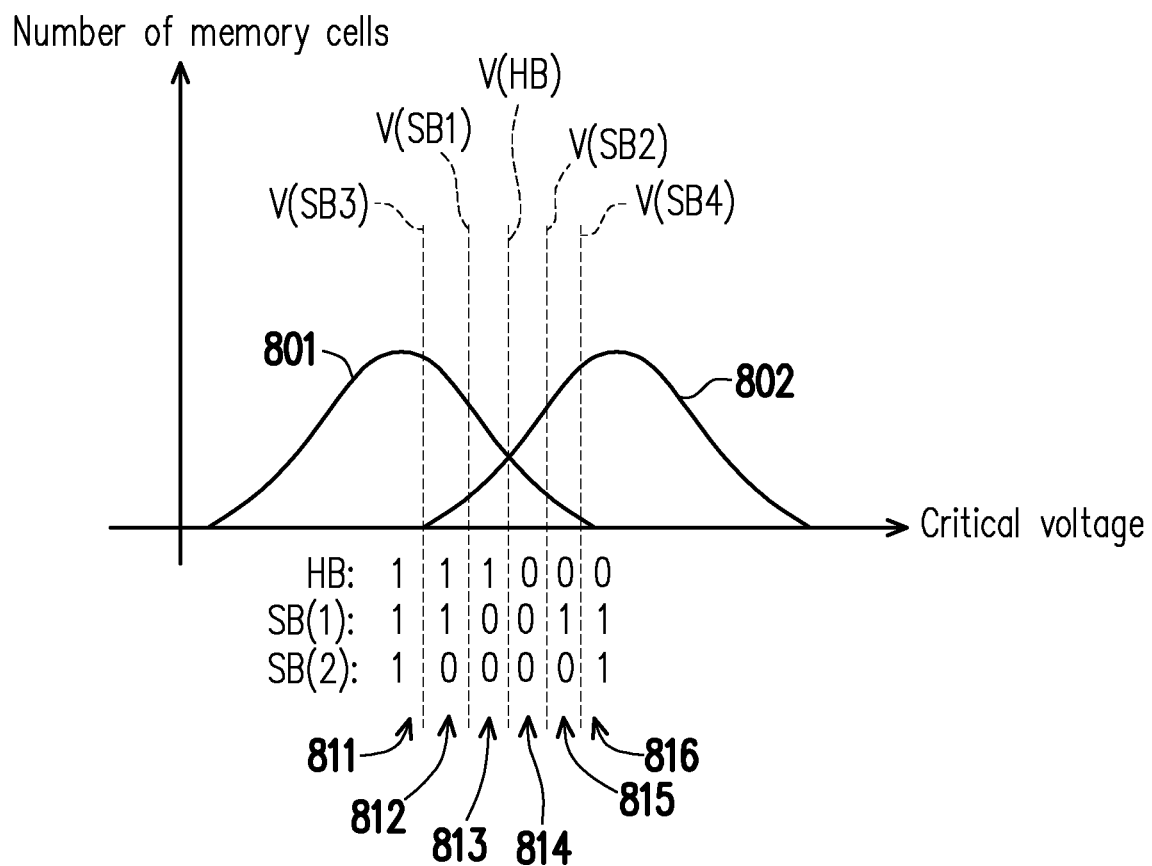
FIG. 8 is a schematic view of distribution of a critical voltage of a first physical unit and reading of the first physical unit using multiple read voltage levels according to an exemplary embodiment of the disclosure.

FIG. 8 is a schematic view of distribution of a critical voltage of a first physical unit and reading of the first physical unit using multiple read voltage levels according to an exemplary embodiment of the disclosure. Referring to FIG. 8, it is assumed that the first physical unit includes multiple memory cells, and distribution of critical voltages of the memory cells includes states 801 and 802. For example, the state 801 corresponds to a bit of "1", and the state 802 corresponds to a bit of "0". In other words, if the critical voltage of one certain memory cell belongs to the state 801, it means that the memory cell is configured to store the bit of "1". If the critical voltage of one certain memory cell belongs to the state 802, it means that the memory cell is configured to store the bit of "0". It should be noted that states 801 and 802 may also correspond to other bits or bit combinations, and the disclosure is not limited thereto.

In an exemplary embodiment, as a usage level (or a wear level) of the first physical unit increases, and/or changes in an ambient temperature become larger, an overlapping area between the states 801 and 802 may gradually expand. At this time, a determination result that one certain memory cell belongs to the state 801 or 802 may gradually become inaccurate. For example, after a read voltage level V(HB) is applied to the first physical cell, a default is that the critical voltage of one certain memory cell belonging to the state 801 may be greater than the read voltage level V(HB). Therefore, the bit stored in the memory cell may be misjudged as the bit of "0" (i.e., the bit corresponding to the state 802). In addition, after the read voltage level V(HB) is applied to the first physical cell, the default is that the critical voltage of one certain memory cell belonging to the state 802 may be less than the read voltage level V(HB). Therefore, the bit stored in the memory cell may be misjudged as the bit of "1" (i.e., the bit corresponding to the state 801). In this case, the data (i.e., the first data) read from the first physical unit may contain a large number of erroneous bits, and even the total number of the erroneous bits may exceed a maximum number of erroneous bits that may be corrected in the hard decode mode. At this time, the error checking and correction circuit 54 may instead decode the data based on the soft decode mode to improve the decoding success rate of the data.

In an exemplary embodiment, in the soft decode mode, the memory management circuit 51 may send at least one reading command sequence to the rewritable non-volatile memory module 43. The reading command sequences may be configured to instruct the rewritable non-volatile memory module 43 to read the data (i.e., first data) from the first physical unit based on multiple read voltage levels. For example, the read voltage levels may include the read voltage level V(HB) and read voltage levels V(SB1) to V(SB4) in FIG. 8. In addition, the first data may include bits HB, SB(1), and SB(2) in FIG. 8. For example, the bit HB is a hard bit, and the bits SB(1) and SB(2) are soft bits.

In an exemplary embodiment, by sequentially applying the read voltage levels V(HB) and V(SB1) to V(SB4) to one certain memory cell in the rewritable non-volatile memory module 43, the rewritable non-volatile memory module 43 may return the bits HB, SB(1), and SB(2) to the memory management circuit 51 according to a reading result of the memory cell. The bit HB may reflect the reading result of the memory cell using the read voltage level V(HB). For example, in response to the critical voltage of one certain memory cell being lower than the read voltage level V(HB), the rewritable non-volatile memory module 43 may return the bit HB with a bit value of "1" to the memory management circuit 51. In addition, in response to the critical voltage of one certain memory cell being higher than the read voltage level V(HB), the rewritable non-volatile memory module 43 may return the bit HB with a bit value of "0" to the memory management circuit 51. By analogy, the bits SB(1) and SB(2) may reflect the reading results of the memory cell using the read voltage levels V(SB1) to V(SB4).

In an exemplary embodiment, the read voltage levels V(SB1) to V(SB4) may define multiple voltage intervals 811 to 816. For example, the voltage interval 812 is between the read voltage levels V(SB1) and V(SB2), and the rest may be derived by analogy. In an exemplary embodiment, by reading the bits HB, SB(1), and SB(2) obtained by one certain memory cell, it may be reflected that the critical voltage of the memory cell is in one of the voltage intervals 811 to 816. For example, it is assumed that by reading the bits HB, SB(1), and SB(2) obtained by one certain memory cell to be "110", it means that the critical voltage of the memory cell is in the voltage interval 812. In addition, it is assumed that by reading the bits HB, SB(1), and SB(2) obtained by one certain memory cell are "011", it means that the critical voltage of the memory cell is in the voltage interval 816, and the rest may be derived by analogy. It should be noted that a total number of the read voltage levels V(SB1) to V(SB4) and a total number of the voltage intervals 811 to 816 may be adjusted according to practical requirements, and the disclosure is not limited thereto.

In an exemplary embodiment, each of the voltage intervals 811 to 816 corresponds to a decoding parameter used in the single-frame decoding mode. Taking the voltage interval 811 as an example, the decoding parameter corresponding to the voltage interval 811 may be dedicated to decoding the data read from at least one memory cell in the first physical unit whose critical voltage is in the voltage interval 811. In addition, taking the voltage interval 812 as an example, the decoding parameter corresponding to the voltage interval 812 may be dedicated to decoding the data read from at least one memory cell in the first physical unit whose critical voltage is in the voltage interval 812, and the rest may be derived by analogy.

In an exemplary embodiment, assuming that the error checking and correction circuit 54 performs the single-frame decoding by using the low density parity check code, the decoding parameter may include a log likelihood ratio (LLR). However, in an exemplary embodiment, if the error checking and correction circuit 54 performs the single-frame decoding by using other types of encoding/decoding algorithms, the decoding parameter may include other types of parameters, and is not limited to the log likelihood ratio. In an exemplary embodiment, during an operation of the memory storage device 10, by updating (i.e., adjusting) the decoding parameter, a decoding success rate of the single-frame decoding may be effectively improved.

In an exemplary embodiment, after entering the multi-frame decoding mode, the memory management circuit 51 may determine whether the total number of the UECC frames in the first data group to be decoded is less than a critical value. For example, if the error checking and correction circuit 54 performs the multi-frame decoding based on the RS code, the critical value may be "3". In addition, if the error checking and correction circuit 54 performs the multi-frame decoding based on the XOR code, the critical value may be "2". If the total number of the UECC frames in the first data group to be decoded is less than the critical value, the memory management circuit 51 may instruct the error checking and correction circuit 54 to perform the multi-frame decoding on the first data group to ensure that all the erroneous bits in the first data may be corrected. However, if the total number of the UECC frames in the first data group to be decoded is not less than the critical value, the memory management circuit 51 may try to update the decoding parameter used for the single-frame decoding. After updating the decoding parameter, the memory management circuit 51 may instruct the error checking and correction circuit 54 to perform the single-frame decoding on the UECC frames in the first data group again based on the updated decoding parameter in an attempt to improve a decoding success rate of the UECC frames and reduce the total number of the UECC frames in the first data group.

In an exemplary embodiment, the memory management circuit 51 may perform one logical operation on the first data group to obtain index information (also called decoding index information) corresponding to the first data group. It should be noted that the first data group may include the first data and data (i.e., second data) read from other physical units (also called second physical units) in the rewritable non-volatile memory module 43. A total number of the second physical units may be one or more, and the disclosure is not limited thereto. Both the first physical units and the second physical units belong to the first physical unit group. The first physical units and the second physical units are different physical units. In addition, the decoding index information may reflect results of performing the logical operations on the first data and second data. For example, the logical operations may include an XOR computation or other types of logical computations, and the disclosure is not limited thereto.

In an example embodiment, the decoding index information includes a first type index parameter and a second type index parameter. The first type index parameter may reflect that in the first data group, at least one bit located at a certain position (also called a first position) is detected to include the erroneous bit. In addition, the second type index parameter may reflect that in the first data group, at least one bit located at a certain position (also called a second position) is detected not to include the erroneous bit. For example, each of the positions in the first data group may refer to one of the positions 701(1) to 701(*m*) in FIG. 7. The first position is different from the second position. That is, the first position and the second position do not overlap each other.

In an example embodiment, the decoding index information may include a data sequence. The data sequence may reflect the results of performing the logical operations on the first data and second data. Taking the XOR computation as an example of the logical operation, the first type index parameter may be every bit of "1" in the data sequence, and the second type index parameter may be every bit of "0" in the data sequence.

Figure 9:
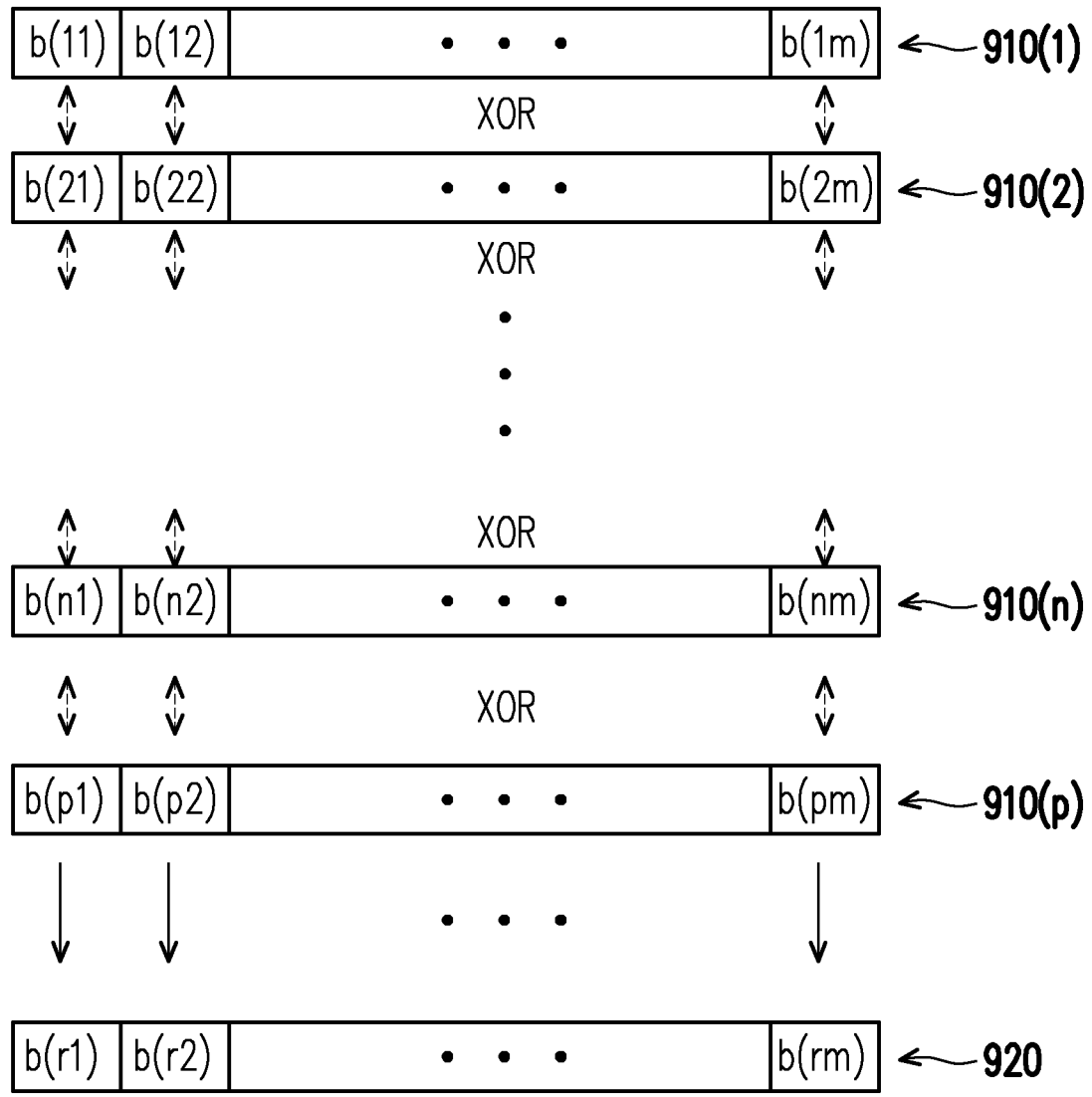
FIG. 9 is a schematic view of performing a logical operation on a first data group to obtain decoding index information according to an exemplary embodiment of the disclosure.

FIG. 9 is a schematic view of performing a logical operation on a first data group to obtain decoding index information according to an exemplary embodiment of the disclosure. Referring to FIG. 9, it is assumed that the first data group includes frames 910(1) to 910(*p*). For example, the first data includes the frame 910(1), and the second data includes the frames 910(2) to 910(*p*). After the XOR computation is performed on the frames 910(1) to 910(*p*), data sequence 920 (i.e., the decoding index information) may be obtained. The data sequence 920 may reflect computation results of performing the XOR computation on the frames 910(1) to 910(*p*). For example, a bit b(r1) in the data sequence 920 may be obtained by performing the XOR computation on bits b(11), b(21), . . . , b(n1), and b(p1) at the same position in the first data group, and a bit b(r2) in the data sequence 920 may be obtained by performing the XOR computation on bits b(12), b(22), . . . , b(n2), and b(p2) at the same position in the first data group. By analogy, a bit b(rm) in the data sequence 920 may be obtained by performing the XOR computation on bit b(1m), b(2m), . . . , b(nm), and b(pm) at the same position in the first data group. The bits b(r1) to b(rm) in the data sequence 920 may be "1" or "0" respectively to reflect the results of the performed XOR computation.

In an exemplary embodiment, in the data sequence 920, the first type index parameter (e.g., the bit "1") may reflect that in the first data group, at least one bit located at the first position is detected to include the erroneous bit. For example, assuming that the bit b(r1) in the data sequence 920 is "1", it means that at least one of the bits b(11), b(21), . . . , b(n1), and b(p1) at the first position in the first data group has a high probability of including the erroneous bit.

In an exemplary embodiment, in the data sequence 920, the second type index parameter (e.g., the bit "0") may reflect that in the first data group, at least one bit corresponding to the second position is detected not to include the erroneous bit. For example, assuming that the bit b(r2) in the data sequence 920 is "0", it means that the bits b(12), b(22), . . . , b(n2), and b(p2) at the second position in the first data group have a high probability of not including any erroneous bits.

In an exemplary embodiment, the memory management circuit 51 may obtain error evaluation information corresponding to a specific voltage interval (also called a first voltage interval) among the voltage intervals according to the first data and the decoding index information. Taking FIG. 8 as an example, the first voltage interval may be one of the voltage intervals 811 to 816. Then, the memory management circuit 51 may update the decoding parameter (also called a first decoding parameter) corresponding to the first voltage interval according to the error evaluation information.

In an exemplary embodiment, the first decoding parameter may be dedicated to decoding the data (also called target data) read from the memory cells (also called first memory cells) in the first physical unit. Critical voltages of the first memory cells are all located in the first voltage interval. Taking the voltage interval 813 in FIG. 8 as an example of the first voltage interval, the first decoding parameter may correspond to the voltage interval 813, and the first decoding parameter may be dedicated to decoding the data (i.e., the target data) read from at least one memory cell (i.e., the first memory cell) in the first physical unit whose critical voltage is located in the voltage interval 813, and the rest may be derived by analogy.

In an exemplary embodiment, the first data includes the target data, and the error evaluation information may include at least one of first error evaluation information and second error evaluation information. The first error evaluation information may reflect a proportion of at least one bit (also called a first bit) located at the first position in the target data. In addition, the second error evaluation information may reflect a proportion of at least one bit (also called a second bit) located at the second position in the target data.

Taking FIG. 9 as an example, it is assumed that the first data includes the frame 910(1), and the bits b(11), b(12), and b(1m) in the frame 910(1) belong to the target data. In addition, it is assumed that in the data sequence 920 (i.e., the decoding index information), the bit b(r1) and the bit b(rm) are "1" (that is, the bit b(r1) and the bit b(rm) are the first type index parameters), and the bit b(r2) is "0" (that is, the bit b(r2) is the second type index parameter). Therefore, in this example, the bit at the first position (i.e. the first bit) in the target data includes the bit b(11) and the b(1m), and the bit at the second position (i.e. the second bit) in the target data includes the bit b(12). By analogy, each of the bits in the frame 910(1) belonging to the target data may be further identified as belonging to the first bit located at the first position or the second bit located at the second position.

In an exemplary embodiment, the memory management circuit 51 may obtain the first error evaluation information according to the proportion of the first bit in the target data. In an exemplary embodiment, the memory management circuit 51 may obtain the second error evaluation information according to the proportion of the second bit in the target data. Then, the memory management circuit 51 may update the first decoding parameter corresponding to the first voltage interval according to at least one of the first error evaluation information and the second error evaluation information.

In an exemplary embodiment, the first decoding parameter corresponding to the first voltage interval includes multiple decoding parameters (also called candidate decoding parameters). The memory management circuit 51 may update the candidate decoding parameters according to the first error evaluation information or the second error evaluation information. For example, the candidate decoding parameters include first candidate decoding parameters and second candidate decoding parameters.

FIG. 10 is a schematic view of a data table according to an exemplary embodiment of the disclosure. Referring to FIG. 10, a data table 1001 may be configured to store various transient data used in an operation of updating the first decoding parameter. For example, the data table 1001 may be configured to record the representative bits (i.e., the bits HB, SB(1), and SB(2)) corresponding to each of the voltage intervals, the number of memory cells N(1) to N(6), the number of first bits M1(1) to M1(6), the number of second bit M2(1) to M2(6), first error evaluation information E1(1) to E1(6), second error evaluation information E2(1) to E2(6), decoding parameter LLR(1) to LLR(6), and decode parameter LLR(1)' to LLR(6)'. It should be noted that in the exemplary embodiment of FIG. 10, the log likelihood ratio (LLR) is used as an example of the decoding parameter, but the disclosure is not limited thereto.

In an exemplary embodiment, it is assumed that one of the voltage intervals 811 to 816 in FIG. 8 is the first voltage interval. The number of memory cells N(i) may reflect a total number of at least one memory cell (i.e., the first memory cell) whose critical voltage is in the first voltage interval in the first physical unit. The number of first bits M1(i) may reflect a total number of the first bit located at the first position in the target data read from the first memory cell. The number of second bits M2(i) may reflect a total number of the second bit located at the second position in the target data. For example, M2(i)=N(i)−M1(i). First error evaluation information E1(i) may reflect the proportion of the first bit in the target data. For example, E1(i)=M1(i)/N(i). Second error evaluation information E2(i) may reflect the proportion of the second bit in the target data. For example, E2(i)=M2(i)/N(i). A decoding parameter LLR(i) is the first candidate decoding parameter corresponding to the first voltage interval. In addition, a decoding parameter LLR(i)' is the second candidate decoding parameter corresponding to the first voltage interval.

In an exemplary embodiment, the memory management circuit 51 may calculate the updated first candidate decoding parameter (i.e., LLR(i)) and the updated second candidate decoding parameter (i.e., LLR(i)') corresponding to the first voltage interval according to the first error evaluation information (i.e., E1(i)) and/or the second error evaluation information (i.e., E2(i)). Thereafter, the memory management circuit 51 may instruct the error checking and correction circuit 54 to decode the bit at the first position (i.e., the first bit) in the target data read from the first memory cell according to the decoding parameter LLR(i), and/or decode the bit at the second position (i.e., the second bit) in the target data according to the decoding parameter LLR(i)'.

In an exemplary embodiment, the memory management circuit 51 may obtain first sub-evaluation information and second sub-evaluation information according to the error evaluation information. The first sub-evaluation information may reflect, in the first data group, the probability that only the first data includes the erroneous bit for the first position where the erroneous bit is detected. In addition, the second sub-evaluation information may reflect, in the first data group, the probability that only the second data includes the erroneous bit for the first position where the erroneous bit is detected. Then, the memory management circuit 51 may obtain and update the first decoding parameter (e.g., the first candidate decoding parameter) according to the first sub-evaluation information and the second sub-evaluation information.

In an exemplary embodiment, the memory management circuit 51 may obtain the first candidate decoding parameter according to the following equations (1.1) to (1.5).

$$Pe(i) = E1(i) \times W1 \qquad (1.1)$$

$$P(i) = E1(i) \times W2 \qquad (1.2)$$

$$P1 = P(i) \times (1 - Pe(i)) \qquad (1.3)$$

$$P2 = (1 - P(i)) \times (Pe(i)) \qquad (1.4)$$

$$LLR(i) = \ln(P2/P1) \qquad (1.5)$$

In the equations (1.1) to (1.5), LLR(i) represents the first candidate decoding parameter, E1(i) represents the first error evaluation information, P1 represents the first sub-evaluation information, P2 represents the second sub-evaluation information, and ln( ) represents a natural logarithm function, and W1 and W2 are constants. It should be noted that equations (1.1) to (1.5) may also be adjusted according to the practical requirements, and the disclosure is not limited thereto.

In an exemplary embodiment, the memory management circuit 51 may obtain third sub-evaluation information and fourth sub-evaluation information according to the error evaluation information. The third sub-evaluation information may reflect, in the first data group, the probability that both the first data and the second data indeed do not include the erroneous bit for the second position where no erroneous bit is detected. In addition, the fourth sub-evaluation information may reflect, in the first data group, the probability that both the first data and the second data actually include the erroneous bits for the second position where no erroneous bit is detected. Then, the memory management circuit 51 may obtain and update the first decoding parameter (e.g., the second candidate decoding parameter) according to the third sub-evaluation information and the fourth sub-evaluation information.

In an exemplary embodiment, the memory management circuit 51 may obtain the second candidate decoding parameter according to the following equations (2.1) to (2.3).

$$P3 = (1 - P(i)) \times (1 - Pe(i)) \quad (2.1)$$

$$P4 = P(i) \times Pe(i) \quad (2.2)$$

$$LLR(i)' = \ln(P4/P3) \quad (2.3)$$

In the equations (2.1) to (2.3), LLR(i)' represents the second candidate decoding parameter, P3 represents the third sub-evaluation information, and P4 represents the fourth sub-evaluation information. It should be noted that equations (2.1) to (2.3) may also be adjusted according to the practical requirements, and the disclosure is not limited thereto.

FIG. 11 is a schematic view of recording error state descriptions respectively corresponding to multiple sub-evaluation information according to an exemplary embodiment of the present disclosure. Referring to FIG. 11, according to a data table 1101, the first sub-evaluation information P1 may reflect, in the first data group, the probability that only the first data actually includes the erroneous bit for the first position determined to have the erroneous bit. The second sub-evaluation information P2 may reflect, in the first data group, the probability that only the second data actually includes the erroneous bit for the first position determined to have the erroneous bit. The third sub-evaluation information P3 may reflect, in the first data group, the probability that both the first data and the second data actually do not include the erroneous bit for the second position where it is determined that there is no erroneous bit. The fourth sub-evaluation information P4 may reflect, in the first data group, the probability that both the first data and the second data actually include the erroneous bit for the second position where it is determined that there is no erroneous bit. It should be noted that an error state corresponding to the sub-evaluation information P1 to P4 may also be adjusted according to the practical requirements, and the disclosure is not limited thereto.

In an exemplary embodiment, after obtaining and updating the decoding parameter corresponding to each of the voltage intervals, in the subsequently performed soft decoding operation, according to which memory cell of the voltage intervals 811 to 816 in FIG. 8 the data to be decoded is read from, one of the decoding parameters LLR(1) to LLR(6) (and/or one of the LLR(1)' to LLR(6)') may be provided to the error checking and correction circuit 54. For example, assuming that the data to be decoded is read from the memory cell belonging to the voltage interval 811 in the first physical unit, the decoding parameters LLR(1) and/or LLR(1)' may be provided to the error checking and correction circuit 54. In addition, assuming that the data to be decoded is read from the memory cell belonging to the voltage interval 814 in the first physical unit, the decoding parameters LLR(4) and/or LLR(4)' may be provided to the error checking and correction circuit 54. In the soft decoding operation, the error checking and correction circuit 54 may decode data according to the received decoding parameter. In this way, the success rate of the single-frame decoding performed on the UECC frames in the first data group may be effectively improved, thereby reducing the total number of the UECC frames in the first data group. Once the total number of the UECC frames in the first data group is reduced to less than the critical value, the memory management circuit 51 may instruct the error checking and correction circuit 54 to perform the multi-frame decoding on the first data group to correct all the erroneous bits in the first data.

It should be noted that in the above exemplary embodiment, only how to obtain the first candidate decoding parameter (i.e., LLR(i)) and the second candidate decoding parameter (i.e. LLR(i)') corresponding to the first voltage interval according to the first error evaluation information (i.e. E1(i)) is described. However, those skilled in the relevant technical fields should be able to understand or deduce how to obtain the first candidate decoding parameter (i.e., LLR(i)) and the second candidate decoding parameter (i.e., LLR(i)') corresponding to the first voltage interval according to the second error evaluation information (i.e., E2(i)). Therefore, the same details will not be repeated in the following.

Figure 12:
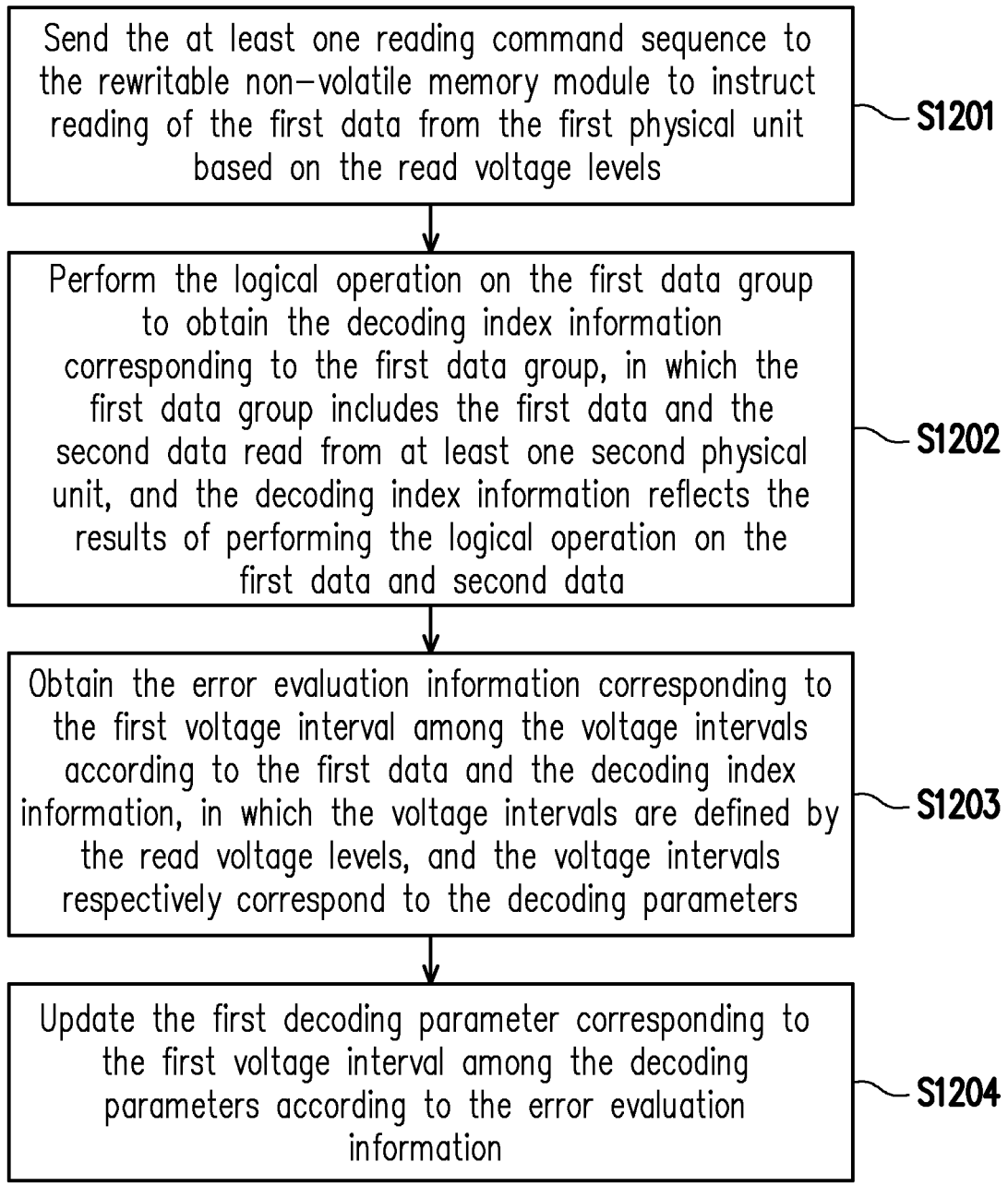
FIG. 12 is a flow chart of a decoding parameter updating method according to an exemplary embodiment of the disclosure.

FIG. 12 is a flow chart of a decoding parameter updating method according to an exemplary embodiment of the disclosure. Referring to FIG. 12, in step S1201, the at least one reading command sequence is sent to the rewritable non-volatile memory module to instruct reading of the first data from the first physical unit based on the read voltage levels. In step S1202, the logical operation is performed on the first data group to obtain the decoding index information corresponding to the first data group. The first data group includes the first data and the second data read from at least one second physical unit, and the decoding index information reflects the results of performing the logical operation on the first data and second data. In step S1203, the error evaluation information corresponding to the first voltage interval among the voltage intervals is obtained according to the first data and the decoding index information. The voltage intervals are defined by the read voltage levels, and the voltage intervals respectively correspond to the decoding parameters. In step S1204, the first decoding parameter corresponding to the first voltage interval among the decoding parameters is updated according to the error evaluation information.

However, each of the steps in FIG. 12 has been described in detail above. Therefore, the same details will not be repeated in the following. It is worth noting that each of the steps in FIG. 12 may be implemented as multiple program codes or circuits, and the disclosure is not limited thereto. In addition, the method in FIG. 12 may be used in conjunction with the above exemplary embodiments or may be used alone, and the disclosure is not limited thereto.

Based on the above, the decoding parameter updating method, the memory storage device, and the memory control circuit unit provided in the disclosure may dynamically update the first decoding parameter corresponding to the first voltage interval according to the decoding index information initially obtained in the multi-frame decoding mode. In this way, the decoding success rate of the re-performed single-frame decoding after entering the multi-frame decoding mode may be effectively improved.

Although the disclosure has been described with reference to the above embodiments, they are not intended to limit the disclosure. It will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. A decoding parameter updating method for a rewritable non-volatile memory module, wherein the rewritable non-volatile memory module comprises a plurality of physical units, and the decoding parameter updating method comprises:

sending at least one reading command sequence to the rewritable non-volatile memory module to instruct reading of first data from a first physical unit among the physical units based on a plurality of read voltage levels;

performing a logical operation on a first data group to obtain decoding index information corresponding to the first data group, wherein the first data group comprises the first data and second data read from at least one second physical unit among the physical units, and the decoding index information reflects a result of performing the logical operation on the first data and the second data;

obtaining error evaluation information corresponding to a first voltage interval among a plurality of voltage intervals according to the first data and the decoding index information, wherein the voltage intervals are defined by the read voltage levels, and the voltage intervals respectively correspond to a plurality of decoding parameters; and updating a first decoding parameter corresponding to the first voltage interval among the decoding parameters according to the error evaluation information.

2. The decoding parameter updating method according to claim 1, wherein the first decoding parameter is dedicated to decoding data read from a plurality of first memory cells in the first physical unit, and critical voltages of the first memory cells are all located in the first voltage interval.

3. The decoding parameter updating method according to claim 1, wherein the decoding index information comprises a first type index parameter and a second type index parameter, the first type index parameter reflects that in the first data group, at least one bit located at a first position is detected to comprise an erroneous bit, and the second type index parameter reflects that in the first data group, at least one bit located at a second position is detected not to comprise the erroneous bit.

4. The decoding parameter updating method according to claim 3, wherein the first data comprises target data read from a plurality of first memory cells in the first physical unit, critical voltages of the first memory cells are all located in the first voltage interval, the error evaluation information comprises at least one of first error evaluation information and second error evaluation information, the first error evaluation information reflects a proportion of at least one first bit located at the first position in the target data, and the second error evaluation information reflects a proportion of at least one second bit located at the second position in the target data.

5. The decoding parameter updating method according to claim 4, wherein a step of updating the first decoding parameter corresponding to the first voltage interval among the decoding parameters according to the error evaluation information comprises:

obtaining first sub-evaluation information and second sub-evaluation information according to the error evaluation information, wherein the first sub-evaluation information reflects, in the first data group, a probability that only the first data comprises the erroneous bit for the first position, and the second sub-evaluation information reflects, in the first data group, a probability that only the second data comprises the erroneous bit for the first position; and updating the first decoding parameter according to the first sub-evaluation information and the second sub-evaluation information.

6. The decoding parameter updating method according to claim 5, wherein the first decoding parameter comprises a first candidate decoding parameter, and a step of updating the first decoding parameter according to the first sub-evaluation information and the second sub-evaluation information comprises:

obtaining the first candidate decoding parameter according to the following equation:

$$LLR(i) = \ln\left(\frac{P2}{P1}\right)$$

wherein LLR(i) represents the first candidate decoding parameter, P1 represents the first sub-evaluation information, P2 represents the second sub-evaluation information, and ln( ) represents a natural logarithm function.

7. The decoding parameter updating method according to claim 4, wherein a step of updating the first decoding parameter corresponding to the first voltage interval among the decoding parameters according to the error evaluation information comprises:

obtaining third sub-evaluation information and fourth sub-evaluation information according to the error evaluation information, wherein the third sub-evaluation information reflects, in the first data group, a probability that both the first data and the second data do not comprise the erroneous bit for the second position, and the fourth sub-evaluation information reflects, in the first data group, a probability that both the first data and the second data comprise the erroneous bit for the second position; and updating the first decoding parameter according to the third sub-evaluation information and the fourth sub-evaluation information.

8. The decoding parameter updating method according to claim 7, wherein the first decoding parameter comprises second candidate decoding parameter, and a step of updating the first decoding parameter according to the third sub-evaluation information and the fourth sub-evaluation information comprises:

obtaining the second candidate decoding parameter according to the following equation:

$$LLR(i)' = \ln\left(\frac{P4}{P3}\right)$$

wherein LLR(i)' represents the second candidate decoding parameter, P3 represents the third sub-evaluation information, P4 represents the fourth sub-evaluation information, and ln( ) represents a natural logarithm function.

9. The decoding parameter updating method according to claim 4, wherein the first decoding parameter comprises a first candidate decoding parameter and a second candidate decoding parameter, and the decoding parameter updating method further comprises:

decoding the at least one first bit located at the first position in the target data according to the first candidate decoding parameter; and decoding the at least one second bit located at the second position in the target data according to the second candidate decoding parameter.

10. A memory storage device, comprising:
a connection interface unit configured to be coupled to a host system;
a rewritable non-volatile memory module, wherein the rewritable non-volatile memory module comprises a plurality of physical units; and
a memory control circuit unit coupled to the connection interface unit and the rewritable non-volatile memory module,
wherein the memory control circuit unit is configured to:
send at least one reading command sequence to the rewritable non-volatile memory module to instruct reading of first data from a first physical unit among the physical units based on a plurality of read voltage levels;
perform a logical operation on a first data group to obtain decoding index information corresponding to the first data group, wherein the first data group comprises the first data and second data read from at least one second physical unit among the physical units, and the decoding index information reflects a result of performing the logical operation on the first data and the second data;
obtain error evaluation information corresponding to a first voltage interval among a plurality of voltage intervals according to the first data and the decoding index information, wherein the voltage intervals are defined by the read voltage levels, and the voltage intervals respectively correspond to a plurality of decoding parameters; and
update a first decoding parameter corresponding to the first voltage interval among the decoding parameters according to the error evaluation information.

11. The memory storage device according to claim 10, wherein the first decoding parameter is dedicated to decoding data read from a plurality of first memory cells in the first physical unit, and critical voltages of the first memory cells are all located in the first voltage interval.

12. The memory storage device according to claim 10, wherein the decoding index information comprises a first type index parameter and a second type index parameter, the first type index parameter reflects that in the first data group, at least one bit located at a first position is detected to comprise an erroneous bit, and the second type index parameter reflects that in the first data group, at least one bit located at a second position is detected not to comprise the erroneous bit.

13. The memory storage device according to claim 12, wherein the first data comprises target data read from a plurality of first memory cells in the first physical unit, critical voltages of the first memory cells are all located in the first voltage interval, the error evaluation information comprises at least one of first error evaluation information and second error evaluation information, the first error evaluation information reflects a proportion of at least one first bit located at the first position in the target data, and the second error evaluation information reflects a proportion of at least one second bit located at the second position in the target data.

14. The memory storage device according to claim 13, wherein an operation of updating the first decoding parameter corresponding to the first voltage interval among the decoding parameters according to the error evaluation information comprises:
obtaining first sub-evaluation information and second sub-evaluation information according to the error evaluation information, wherein the first sub-evaluation information reflects, in the first data group, a probability that only the first data comprises the erroneous bit for the first position, and the second sub-evaluation information reflects, in the first data group, a probability that only the second data comprises the erroneous bit for the first position; and
updating the first decoding parameter according to the first sub-evaluation information and the second sub-evaluation information.

15. The memory storage device according to claim 14, wherein the first decoding parameter comprises a first candidate decoding parameter, and an operation of updating the first decoding parameter according to the first sub-evaluation information and the second sub-evaluation information comprises:
obtaining the first candidate decoding parameter according to the following equation:

$$LLR(i) = \ln\left(\frac{P2}{P1}\right)$$

wherein LLR(i) represents the first candidate decoding parameter, P1 represents the first sub-evaluation information, P2 represents the second sub-evaluation information, and ln( ) represents a natural logarithm function.

16. The memory storage device according to claim 13, wherein an operation of updating the first decoding parameter corresponding to the first voltage interval among the decoding parameters according to the error evaluation information comprises:
obtaining third sub-evaluation information and fourth sub-evaluation information according to the error evaluation information, wherein the third sub-evaluation information reflects, in the first data group, a probability that both the first data and the second data do not comprise the erroneous bit for the second position, and the fourth sub-evaluation information reflects, in the first data group, a probability that both the first data and the second data comprise the erroneous bit for the second position; and
updating the first decoding parameter according to the third sub-evaluation information and the fourth sub-evaluation information.

17. The memory storage device according to claim 16, wherein the first decoding parameter comprises second candidate decoding parameter, and an operation of updating the first decoding parameter according to the third sub-evaluation information and the fourth sub-evaluation information comprises:
obtaining the second candidate decoding parameter according to the following equation:

$$LLR(i)' = \ln\left(\frac{P4}{P3}\right)$$

wherein LLR(i)' represents the second candidate decoding parameter, P3 represents the third sub-evaluation information, P4 represents the fourth sub-evaluation information, and ln( ) represents a natural logarithm function.

18. The memory storage device according to claim 13, wherein the first decoding parameter comprises a first candidate decoding parameter and a second candidate decoding parameter, and the memory control circuit unit is further configured to:
- decode the at least one first bit located at the first position in the target data according to the first candidate decoding parameter; and
- decode the at least one second bit located at the second position in the target data according to the second candidate decoding parameter.

19. A memory control circuit unit configured to control a rewritable non-volatile memory module, wherein the rewritable non-volatile memory module comprises a plurality of physical units, and the memory control circuit unit comprises:
- a host interface configured to be coupled to a host system;
- a memory interface configured to be coupled to the rewritable non-volatile memory module;
- a decoding circuit; and
- a memory management circuit coupled to the host interface, the memory interface, and the decoding circuit,
wherein the memory management circuit is configured to:
- send at least one reading command sequence to the rewritable non-volatile memory module to instruct reading of first data from a first physical unit among the physical units based on a plurality of read voltage levels;
- perform a logical operation on a first data group to obtain decoding index information corresponding to the first data group, wherein the first data group comprises the first data and second data read from at least one second physical unit among the physical units, and the decoding index information reflects a result of performing the logical operation on the first data and the second data;
- obtain error evaluation information corresponding to a first voltage interval among a plurality of voltage intervals according to the first data and the decoding index information, wherein the voltage intervals are defined by the read voltage levels, and the voltage intervals respectively correspond to a plurality of decoding parameters; and
- update a first decoding parameter corresponding to the first voltage interval among the decoding parameters according to the error evaluation information.

20. The memory control circuit unit according to claim 19, wherein the first decoding parameter is dedicated to decoding data read from a plurality of first memory cells in the first physical unit, and critical voltages of the first memory cells are all located in the first voltage interval.

21. The memory control circuit unit according to claim 19, wherein the decoding index information comprises a first type index parameter and a second type index parameter, the first type index parameter reflects that in the first data group, at least one bit located at a first position is detected to comprise an erroneous bit, and the second type index parameter reflects that in the first data group, at least one bit located at a second position is detected not to comprise the erroneous bit.

22. The memory control circuit unit according to claim 21, wherein the first data comprises target data read from a plurality of first memory cells in the first physical unit, critical voltages of the first memory cells are all located in the first voltage interval, the error evaluation information comprises at least one of first error evaluation information and second error evaluation information, the first error evaluation information reflects a proportion of at least one first bit located at the first position in the target data, and the second error evaluation information reflects a proportion of at least one second bit located at the second position in the target data.

23. The memory control circuit unit according to claim 22, wherein an operation of updating the first decoding parameter corresponding to the first voltage interval among the decoding parameters according to the error evaluation information comprises:
- obtaining first sub-evaluation information and second sub-evaluation information according to the error evaluation information, wherein the first sub-evaluation information reflects, in the first data group, a probability that only the first data comprises the erroneous bit for the first position, and the second sub-evaluation information reflects, in the first data group, a probability that only the second data comprises the erroneous bit for the first position; and
- updating the first decoding parameter according to the first sub-evaluation information and the second sub-evaluation information.

24. The memory control circuit unit according to claim 23, wherein the first decoding parameter comprises a first candidate decoding parameter, and an operation of updating the first decoding parameter according to the first sub-evaluation information and the second sub-evaluation information comprises:
- obtaining the first candidate decoding parameter according to the following equation:

$$LLR(i) = \ln\left(\frac{P2}{P1}\right)$$

wherein LLR(i) represents the first candidate decoding parameter, P1 represents the first sub-evaluation information, P2 represents the second sub-evaluation information, and ln( ) represents a natural logarithm function.

25. The memory control circuit unit according to claim 22, wherein an operation of updating the first decoding parameter corresponding to the first voltage interval among the decoding parameters according to the error evaluation information comprises:
- obtaining third sub-evaluation information and fourth sub-evaluation information according to the error evaluation information, wherein the third sub-evaluation information reflects, in the first data group, a probability that both the first data and the second data do not comprise the erroneous bit for the second position, and the fourth sub-evaluation information reflects, in the first data group, a probability that both the first data and the second data comprise the erroneous bit for the second position; and
- updating the first decoding parameter according to the third sub-evaluation information and the fourth sub-evaluation information.

26. The memory control circuit unit according to claim 25, wherein the first decoding parameter comprises second candidate decoding parameter, and an operation of updating the first decoding parameter according to the third sub-evaluation information and the fourth sub-evaluation information comprises:
- obtaining the second candidate decoding parameter according to the following equation:

$$LLR(i)' = \ln\left(\frac{P4}{P3}\right)$$

wherein LLR(i)' represents the second candidate decoding parameter, P3 represents the third sub-evaluation information, P4 represents the fourth sub-evaluation information, and ln( ) represents a natural logarithm function.

27. The memory control circuit unit according to claim 22, wherein the first decoding parameter comprises a first candidate decoding parameter and a second candidate decoding parameter, and the decoding circuit is configured to:

decode the at least one first bit located at the first position in the target data according to the first candidate decoding parameter; and decode the at least one second bit located at the second position in the target data according to the second candidate decoding parameter.

\* \* \* \* \*